(No Model.)
S. W. BARTHOLOMEW.
COTTON ELEVATOR AND DISTRIBUTER.
No. 284,359. Patented Sept. 4, 1883.
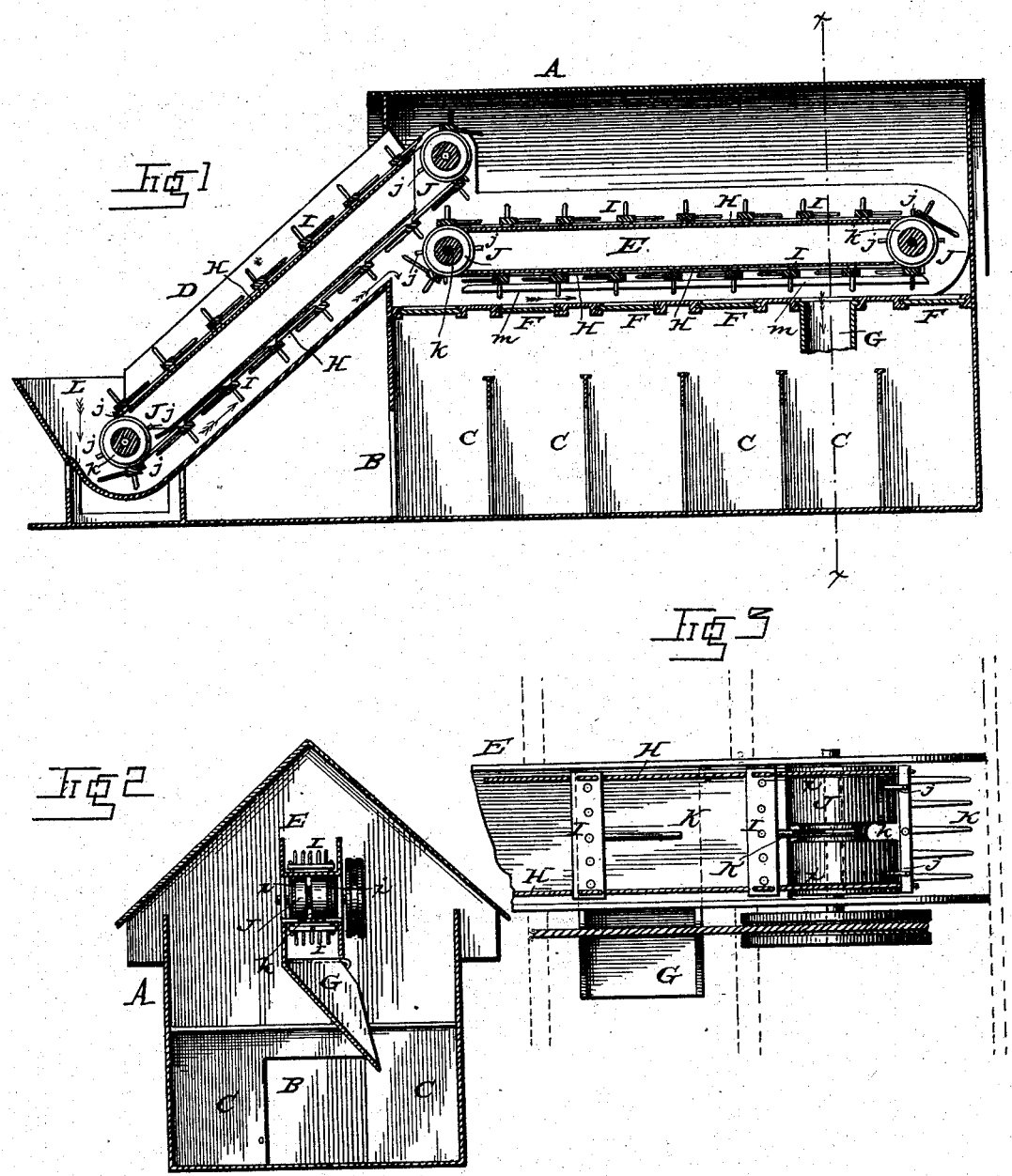

UNITED STATES PATENT OFFICE.

SIDNEY W. BARTHOLOMEW, OF CASTALIA, NORTH CAROLINA.

COTTON ELEVATOR AND DISTRIBUTER.

SPECIFICATION forming part of Letters Patent No. 284,359, dated September 4, 1883.

Application filed February 13, 1883. (No model.)

*To all whom it may concern:*

Be it known that I, SIDNEY W. BARTHOLOMEW, of Castalia, in the county of Nash and State of North Carolina, have invented a new and useful Improvement in Seed-Cotton Elevators and Distributers for Gin-Houses, of which the following is a full, clear, and exact description, reference being had to the annexed drawings, forming part of this specification.

This invention relates to machinery for storing seed-cotton in custom gin-houses, and also for feeding the same to the gin; and the invention consists in the novel construction hereinafter described and claimed.

In the drawings, Figure 1 is a longitudinal section of a gin-house and the cotton elevator and distributer. Fig. 2 is a transverse section of the same on line $x\ x$, Fig. 1; and Fig. 3 is a plan view of a part of the distributer.

A indicates a custom gin-house, having a central passage-way, B, and a series of stalls or chambers, C, on each side of the passage, in which stalls it is common to store preparatory to ginning the several respective batches of cotton belonging to different customers. To save the labor of storing this cotton by hand I provide an elevator, D, at one end of the house, on the outside thereof, which is adapted to communicate with a distributer, E, arranged in the upper part of the house, and extending from one end thereof to the other. The bottom of the distributer is provided with openings corresponding to the stalls, and adapted to be closed by slides F, so that by removing one of the slides and attaching a chute, G, underneath the opening the cotton may be thrown to either side of the passage B into any one of the stalls as it falls through the opening.

The elevator and distributer are constructed substantially in the same manner, each consisting of two endless ropes, H, secured to opposite ends of a series of rakes, I, and passed around pulleys J, which are to be suitably supported, and adapted for receiving motion from any desired source of power. The pulleys J have grooves $i\ i$ for the ropes, and studs $j\ j$ to prevent the ropes from slipping in the grooves. The pulleys are also provided with a deep circumferential groove, $k$, at the center, to accommodate the handles K of the rakes I. The object of the handles K is to prevent the rakes from yielding and turning backward when drawn against the cotton. The upper end of the inclined elevator D extends above the adjacent end of the distributer E, so that as the cotton is drawn up the elevator it will tend to drop into the distributer, and will be easily caught by the rakes of the latter. The lower end of the elevator communicates with a hopper, L, into which the cotton is to be placed.

A duplicate of the elevator may be used inside the gin-house for feeding the cotton to the gin.

The ends of the rakes are to be supported by guides $m$, secured to the inner sides of the boxes of the elevator and distributer to prevent them from rising up while at work, and to keep the teeth of the rakes from touching the bottom of the boxes and roughening the surfaces.

What I claim is—

1. In a cotton-elevator, a belt or pair of ropes having a series of rakes, I, provided with handles K, substantially as shown and described, and for the purpose specified.

2. In a cotton-elevator, the combination, with the ropes carrying the rakes I, of the pulleys J, having grooves $k$ to accommodate the handles of the rakes, substantially as shown and described.

3. In a cotton-elevator, the inclined removable chute, adapted to be secured in an opening in the distributer for throwing the cotton to one side into a stall of a gin-house, substantially as shown and described.

SIDNEY W. BARTHOLOMEW.

Witnesses:
JAMES M. MAY,
WILLIE HARPER.